(12) United States Patent
Gamberg (10) Patent No.: US 9,872,364 B2
(45) Date of Patent: Jan. 16, 2018

(54) VISIBLE STANCHION WITH LED LIGHTING

(71) Applicant: Lytepost Inc., Las Vegas, NV (US)

(72) Inventor: Cory E. Gamberg, Las Vegas, NV (US)

(73) Assignee: LYTEPOST, INC., Las Vegas, NV (US)

( * ) Notice: Subject to any disclaimer, the term of this patent is extended or adjusted under 35 U.S.C. 154(b) by 0 days.

(21) Appl. No.: 15/239,149

(22) Filed: Aug. 17, 2016

(65) Prior Publication Data

US 2017/0135183 A1    May 11, 2017

Related U.S. Application Data

(60) Provisional application No. 62/206,171, filed on Aug. 17, 2015.

(51) Int. Cl.
| | |
|---|---|
| F21V 21/06 | (2006.01) |
| H05B 37/02 | (2006.01) |
| E01F 13/02 | (2006.01) |
| F21V 3/02 | (2006.01) |
| H05B 33/08 | (2006.01) |
| F21S 9/02 | (2006.01) |
| F21S 6/00 | (2006.01) |
| F21Y 115/10 | (2016.01) |
| F21Y 113/13 | (2016.01) |

(52) U.S. Cl.
CPC ....... *H05B 37/0236* (2013.01); *E01F 13/022* (2013.01); *E01F 13/028* (2013.01); *F21S 6/00* (2013.01); *F21S 9/02* (2013.01); *F21V 3/02* (2013.01); *F21V 21/06* (2013.01); *H05B 33/0845* (2013.01); *H05B 33/0857* (2013.01); *H05B 37/0272* (2013.01); *H05B 37/0281* (2013.01); *F21Y 2113/13* (2016.08); *F21Y 2115/10* (2016.08)

(58) Field of Classification Search
CPC ....... E01F 13/02; E01F 13/022; E01F 13/024; F21V 21/10; F21V 21/108; F21V 21/116
See application file for complete search history.

(56) References Cited

U.S. PATENT DOCUMENTS

| | | | | |
|---|---|---|---|---|
| 7,150,117 | B2 * | 12/2006 | Venegas, Jr. | F21S 8/083 362/223 |
| D675,766 | S * | 2/2013 | Guercio | D26/68 |
| 8,424,850 | B2 * | 4/2013 | Bennette | E04F 11/1817 256/10 |
| 2002/0145878 | A1 * | 10/2002 | Venegas, Jr. | F21S 8/083 362/431 |

(Continued)

OTHER PUBLICATIONS

VIP LED Stanchion and Borad Assembly Aug. 17, 2014 (https://web.archive.org/web/20150716114517/http://www.vipcrowdcontrol.com/crowd-control-equipment-forms.html).*

(Continued)

*Primary Examiner* — Jason M Crawford
(74) *Attorney, Agent, or Firm* — One LLP (57) ABSTRACT

A stanchion includes a circular base, a transparent tube coupled to the circular base, a first circuit board with a plurality of controllable light emitting diodes (LEDs) mounted thereon, and a second circuit board including electronics for controlling the LEDs. The LEDs provide a plurality of colors that can be controlled via a remote control device or acoustically.

10 Claims, 12 Drawing Sheets

(56) References Cited

U.S. PATENT DOCUMENTS

| | | | | |
|---|---|---|---|---|
| 2006/0109667 A1* | 5/2006 | Flaherty | ............... | F21S 8/083 |
| | | | | 362/431 |
| 2011/0185491 A1* | 8/2011 | Roberts | ............... | B23P 17/04 |
| | | | | 4/496 |
| 2012/0119907 A1* | 5/2012 | Teuchert | ............... | G08B 5/006 |
| | | | | 340/541 |
| 2012/0206910 A1* | 8/2012 | Watson | ............... | F21V 31/005 |
| | | | | 362/218 |
| 2013/0314916 A1* | 11/2013 | Clore | ............... | F21V 5/04 |
| | | | | 362/235 |
| 2015/0050084 A1* | 2/2015 | Berto | ............... | E01F 13/046 |
| | | | | 404/6 |
| 2015/0332617 A1* | 11/2015 | Cuttill | ............... | E01F 9/688 |
| | | | | 248/237 |
| 2016/0320015 A1* | 11/2016 | Poole | ............... | F21V 33/00 |
| 2016/0326705 A1* | 11/2016 | Torsiello | ............... | E01F 13/024 |

OTHER PUBLICATIONS

VIP LED Stanchion video Jun. 8, 2015 (htttps://www.youtube.com/watch?v=XRajkCAhtLk&feature=youtu.be).*

* cited by examiner

VISIBLE STANCHION WITH LED LIGHTING

CROSS-REFERENCE TO RELATED APPLICATIONS

The present application claims benefit of priority with U.S. Provisional Application No. 62/206,171, filed Aug. 17, 2015, which is hereby incorporated by reference.

TECHNICAL FIELD

The claimed invention relates to stanchions, and more particularly to a visible stanchion with light emitting diode (LED) lighting.

BACKGROUND OF THE INVENTION

Stanchions have been used in crowd control and queueing. Current stanchions are in the form of an upright metal bar or post that includes retractable belts, velvet ropes, or plastic chains. These stanchions are used in theaters and where the flow of people needs to be controlled. The upright metal posts are generally dull looking and can be unattractive. Where lighting needs to be kept low for the ambience of the location, the current stanchions can be difficult to install, move or be seen.

It is therefore desirable to provide an improved stanchion that includes built-in lighting rendering it not only attractive and entertaining, but also easy to be seen, and that provides advantages heretofore unknown in the art.

SUMMARY OF THE INVENTION

Provided herein are embodiments of a visible stanchion that includes controllable light emitting diode (LED) lighting. The stanchion includes a circular base, a transparent tube coupled to the circular base, a first circuit board with a plurality of controllable light emitting diodes (LEDs) mounted thereon, and a second circuit board including electronics for controlling the LEDs. The LEDs provide a plurality of colors that can be controlled via a remote control device or acoustically.

In some embodiments, a visible stanchion includes a circular base, a transparent tube coupled to the circular base, an inner tube positioned inside of and along the axis of the transparent tube, a base circuit board positioned at the base of the inner tube, and an inner circuit board, positioned inside the inner tube, including a plurality of LEDs mounted thereon, wherein the LEDs provide a plurality of colors that can be controlled via a remote control device or acoustically.

In some embodiments, a visible stanchion includes a circular base which includes a circular weight, a ring coupled to the outside wall of the circular weight, and a circular, hollow cone shape base cover coupled to the ring. The visible stanchion also includes a transparent tube coupled to the circular base, an inner tube positioned inside of and along the axis of the transparent tube. A base circuit board is positioned at the base of the inner tube. An inner circuit board, which is positioned inside the inner tube, includes a plurality of remotely controllable light emitting diodes (LEDs) mounted thereon, wherein the LEDs provide a plurality of colors that can be controlled via a remote control device or acoustically.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The present invention may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

The below described figures illustrate the described invention and method of use in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

In the following description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Turning to the drawings, FIGS. 1-8 illustrate exemplary embodiments of a visible stanchion. Making the right first impression is important in business. Where businesses receive large number of clients, controlling the clients' entry while keeping them excited has generally been a challenge. Therefore, a visible stanchion that includes controllable LED lighting may keep a positive energy at the point of entrance, impress the clients and make a great first impression. The visible stanchion may be used in a low-light environment. The visible stanchion may also be a great tool to attract new clients. The visible stanchion may stand out and bring attention to a business, for example, a store front, and allow for great branding opportunities.

In some embodiments, the visible stanchion may include a charging dock designed for efficiency. The visible stanchion may have one or more rechargeable batteries with battery life designed to be sufficiently long enough, for example, to insure power during business hours. The visible stanchions may be interchangeable. For example, instead of having to buy multiple units for different occasions, the visible stanchions may be customized. The visible stanchion may include a branding sleeve that may easily be removed, allowing the display of different sponsors or brands, for example, on different days. The visible stanchion's tops and ropes may also be interchangeable to put forth the different looks for different occasions and locations.

In some embodiments, the visible stanchion may include LED lighting with multiple colors and flashing capability. The LEDs may be controlled via a remote control. In other embodiments, the LEDs may be controlled acoustically.

Figure 1A:
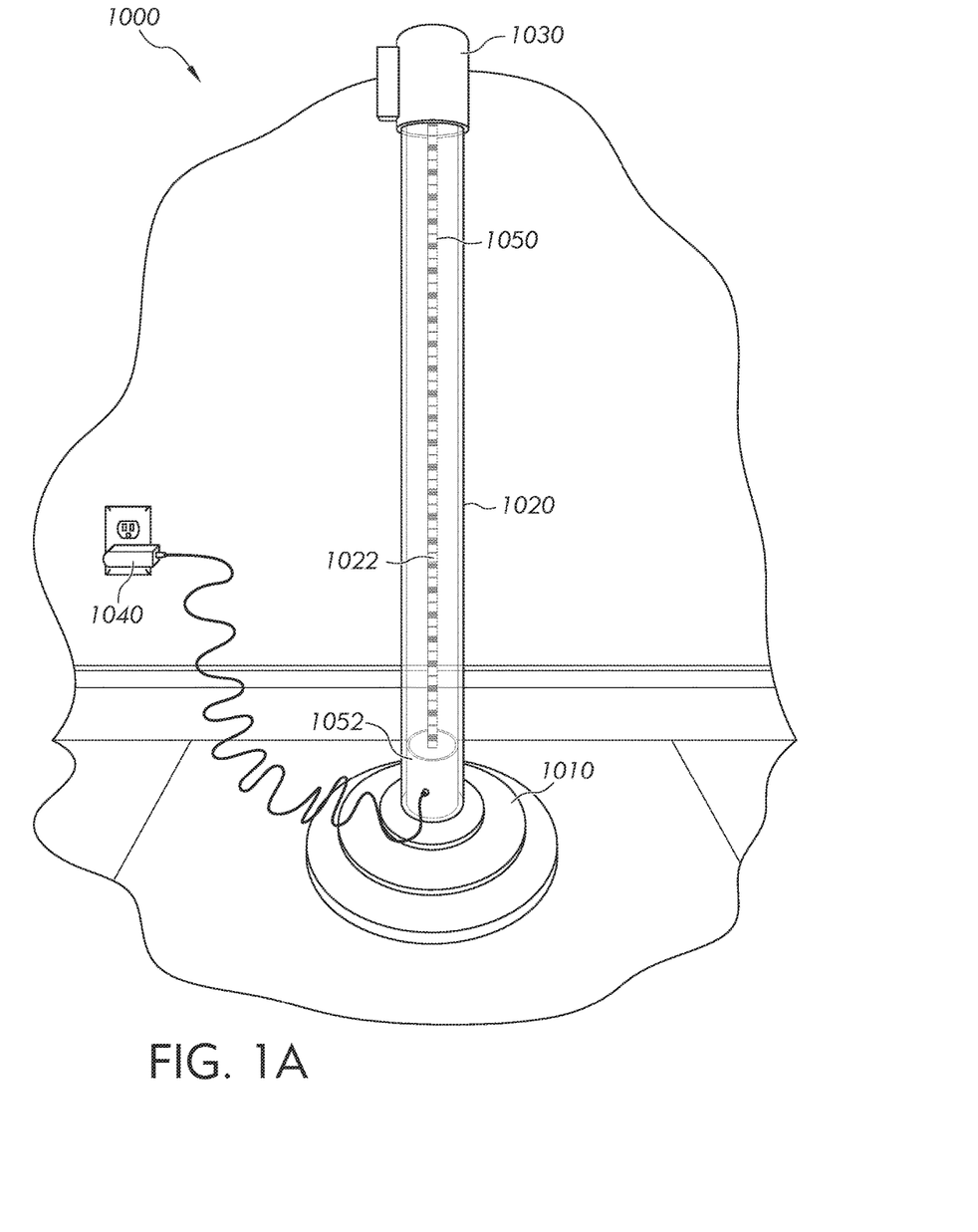
FIG. 1A illustrates a perspective view of a visible stanchion according to an embodiment of the present invention.

Turning to FIG. 1A, a perspective view of an example embodiment of a visible stanchion 1000 is shown. The visible stanchion 1000 generally includes a base 1010, a cylindrical tube 1020 and a cover 1030. The base 1010 is positioned at the proximal, or bottom end of the tube 1020, and may be made of a heavy material, for example, metal, to provide stability for the visible stanchion 1000. The base 1010 may have a finish in chrome, brass, black, etc. The cover 1030 is positioned at the distal, or top end of the tube 1020. In an upright position of the visible stanchion 1000, the base 1010 is at the bottom of the tube 1020 and rests on the ground; the cover 1030 is at the top of the tube 1020. In the descriptions herein, for illustration purposes, the visible stanchion 1000 will be described in an upright position.

In some embodiments, the tube 1020 may be made of transparent, durable material that would not break or crack easily. One such material may be butyrate plastic which is ideal in any length for storage, packaging and shipping. Butyrate tubes are transparent and rigid with excellent dimensional stability and high impact strength. They are strong, durable and easy to fabricate. Butyrate tubing can be cut and sawed with standard equipment. Suitable materials with similar characteristics may also be used to fabricate the tube 1020.

An upright circuit board 1050 may be positioned inside of the tube 1020 and along the axis of the tube 1020. The upright circuit board 1050 may be positioned inside an inner tube 1022 (see also FIG. 6) which is concentric with the tube 1020. The inner tube 1022 may be made of the same material as the tube 1020. A plurality of LEDs may be positioned on the board 1050. In the example embodiment, 24 RGB LEDs are shown, but additional or fewer LEDs may be provided. The LEDs may have multiple solid color settings with multiple active light settings, including an adjustable acoustic control allowing a user to change colors and functions instantly. In some embodiments, the LEDs may have nine solid colors, for example, yellow, red, orange, green, pink (light purple), purple, blue, light blue, and white. A base circuit board 1052, which will be described in more detail herein, may be coupled to the bottom of the board 1050. The base circuit board 1052 may provide control electronics for the visible stanchion 1000.

Figure 1B:
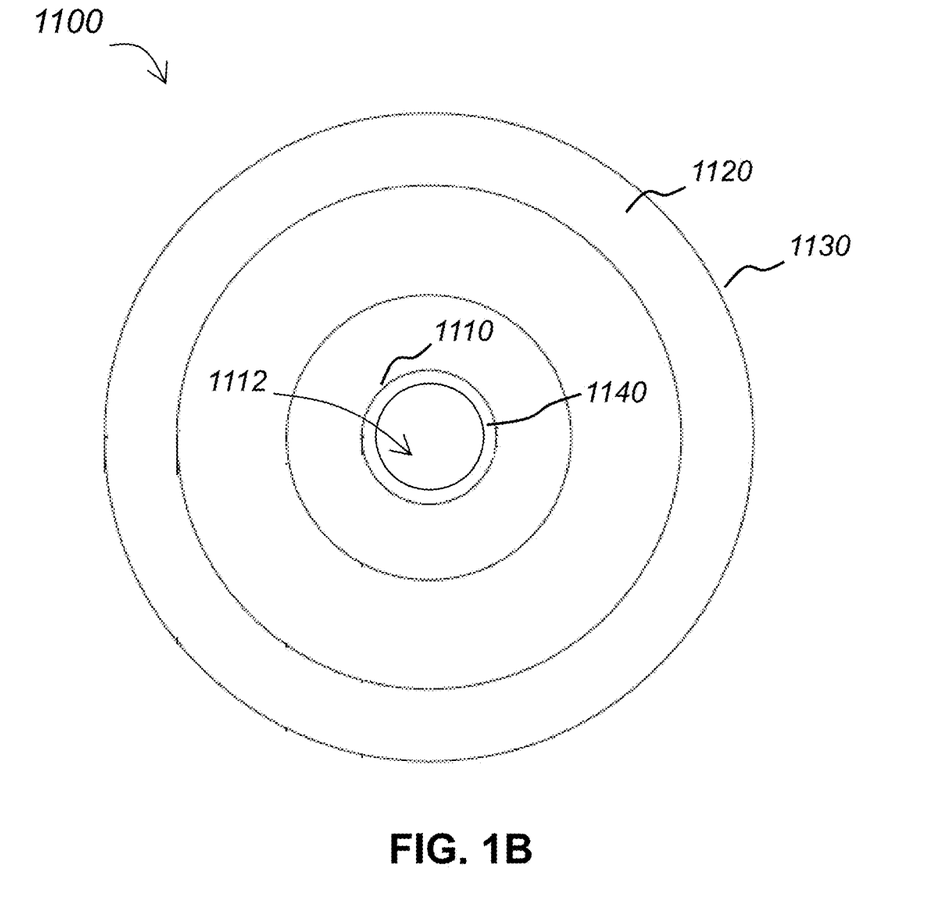
FIG. 1B illustrates a top view of a base cover of a visible stanchion according to an embodiment of the present invention.
Figure 1C:
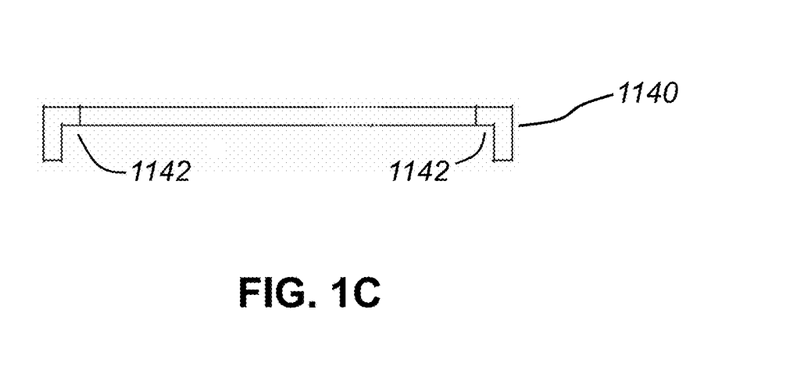
FIG. 1C illustrates a sectional view of a sealing gasket of a visible stanchion according to an embodiment of the present invention.
Figure 1D:
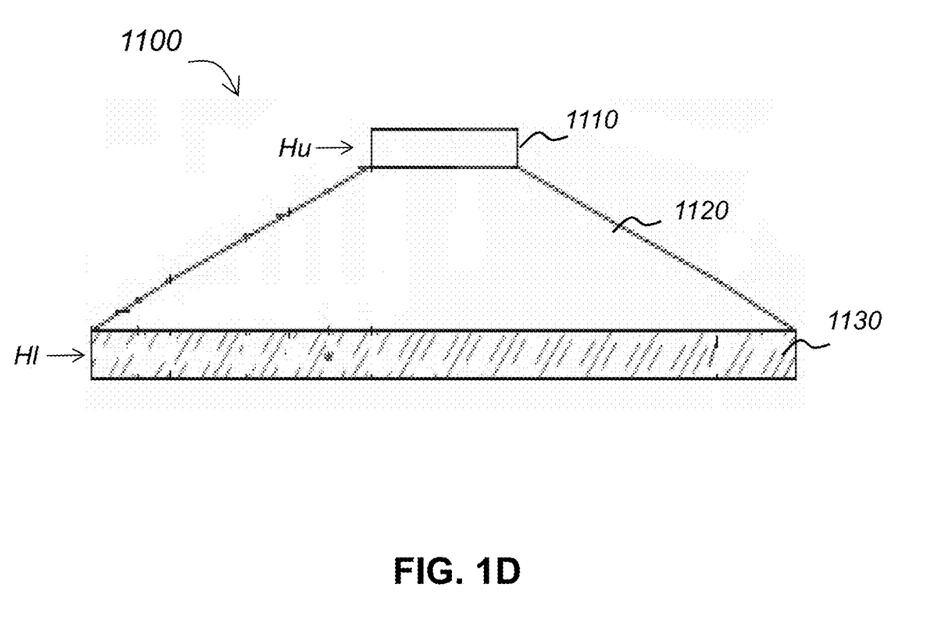
FIG. 1D illustrates a side view of a base cover of a visible stanchion according to an embodiment of the present invention.
Figure 1E:
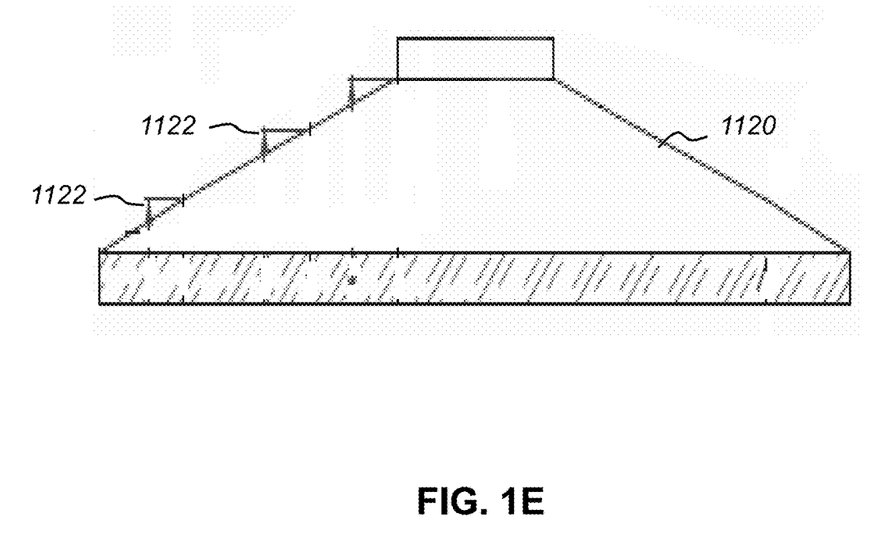
FIG. 1E illustrates another side view of a base cover of a visible stanchion according to an embodiment of the present invention.
Figure 1F:
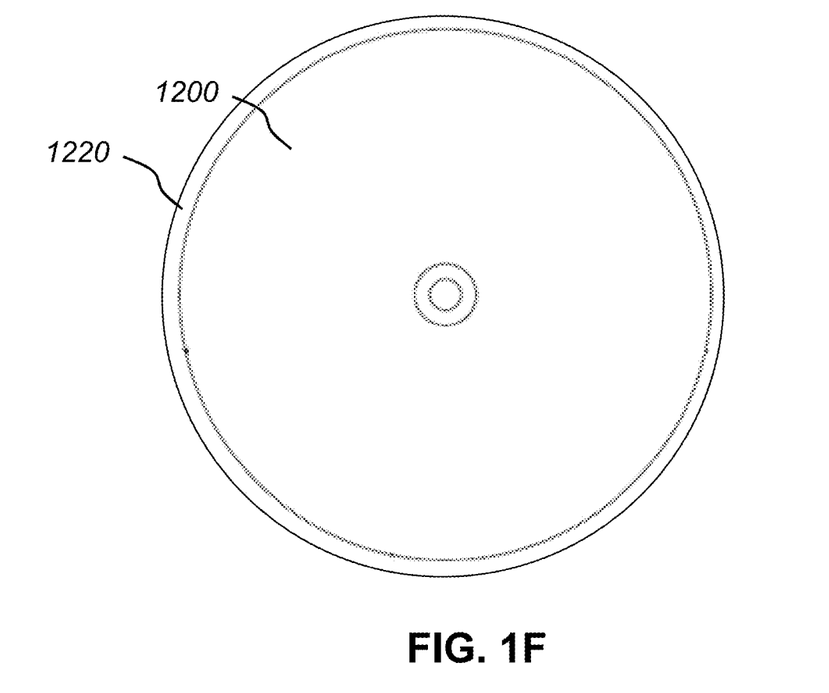
FIG. 1F illustrates a top view of a weight and ring of a visible stanchion according to an embodiment of the present invention.
Figure 1G:
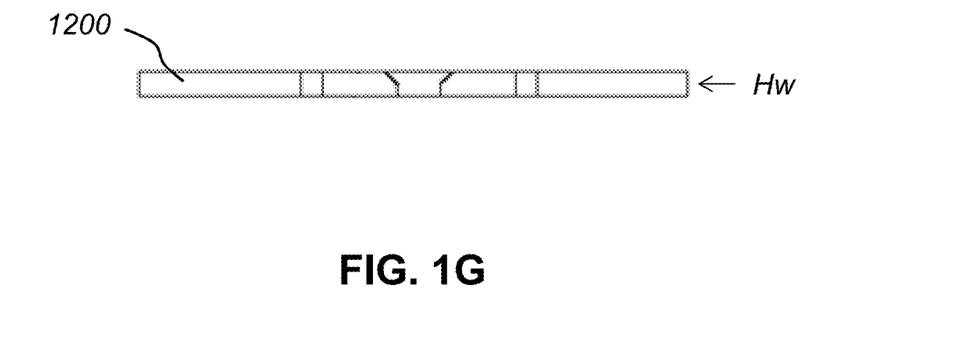
FIG. 1G illustrates side view of a weight of a visible stanchion according to an embodiment of the present invention.

Turning to FIGS. 1B to 1G, example embodiments of a base cover 1100 for the base 1010 of the visible stanchion 1000 are shown. FIG. 1B shows an example top view of the base cover 1100. FIG. 1D shows an example side view of the base cover 1100. The base cover 1100 may have a circular, hollow cone shape and may be used to cover a circular weight 1200, an example of which is shown in FIGS. 1F and 1G. The base cover 1100 may include a circular aperture 1112 positioned in the center of base cover 1100, an upper lip 1110, a slanted cover 1120 and a lower lip 1130. The circular aperture 1112 may be sized to receive a circular sealing gasket 1140. The sealing gasket 1140 may be positioned against the inside wall of the upper lip 1110. As positioned, the sealing gasket 1140 may provide a snug fit for the circular aperture 1112 to receive the circular tube 1020. The snug fit may advantageously provide a water resistant seal.

FIG. 1C shows a sectional side view of an embodiment the circular sealing gasket 1140. The circular sealing gasket 1140 may include a flexible flange 1142 against which the outside wall of the circular tube 1020 may abut, when the circular tube 1020 is coupled to, or inserted into, the circular aperture 1112.

In some embodiments, as shown in FIG. 1E, the slanted cover 1120 may include one or more steps 1122. Although not shown, the steps 1122 circle around the surface of the slanted cover 1120.

Turning to FIGS. 1F and 1G, an embodiment of a circular weight 1200 and a ring 1220 of the base 1010 is shown. The weight 1200 may be used to stabilize the stanchion 1000. The weight 1200 may be made of a heavy material, for example, steal or any other suitable metal, or concrete. The ring 1220 may be positioned and fit tightly around the outside wall of the weight 1200. In some embodiments, the ring 1220 may be made of rubber, for example, neoprene rubber or any suitable elastic material. As described above, the weight 1200 may be covered by the base cover 1100. The lower lip 1130 of the base cover 1100 may be slid onto the outside wall of ring 1220. The ring 1220 may advantageously provide a tight fit and a water resistant seal. In some embodiments, the height Hl of the lower lip 1130 (see FIG. 1D) may be less than the height Hw of the weight 1200. In these embodiments, when the base cover 1100 is fully slid onto the weight 1200, there will be a gap between the bottom edge of the lower lip 1130 and the ground. The gap may advantageously keep the base cover 1100 from touching the ground, for example, to protect both the base cover 1100 and the floor. The gap may also advantageously provide an opening where a user may use to remove the base cover 1100 from the weight 1200, for example, by hooking fingers under the bottom edge of the lower lip 1130 and lifting the base cover 1100 upwardly.

In some example implementations, the height Hw of the weight 1200 may be one inch, the height Hl of the lower lip 1130 may be 0.75 inch, leaving a gap of 0.25 inch when the base cover 1100 is fully slid onto the weight 1200. The thickness of the ring 1220 may be approximately 0.25 inches.

In some example implementations, the weight 1200 may have a diameter of approximately 13 inches. The lower lip 1130 may have a diameter of approximately 13.375 inches. The upper lip 1110 and the sealing gasket 1140 may have a height Hu of approximately 2.25 inches. The weight 1200 may have a weight of approximately 15 pounds.

In some example implementations, the circular aperture 1112 may have a diameter of approximately 2.8 to 3.0 inches.

In some embodiments, a Universal Serial Bus (USB) power supply (not shown) may be positioned inside the base cover 1100. The USB power supply may be removable. In some implementations, the USB power supply may be positioned inside, or covered by, the base cover 1100.

Figure 2:
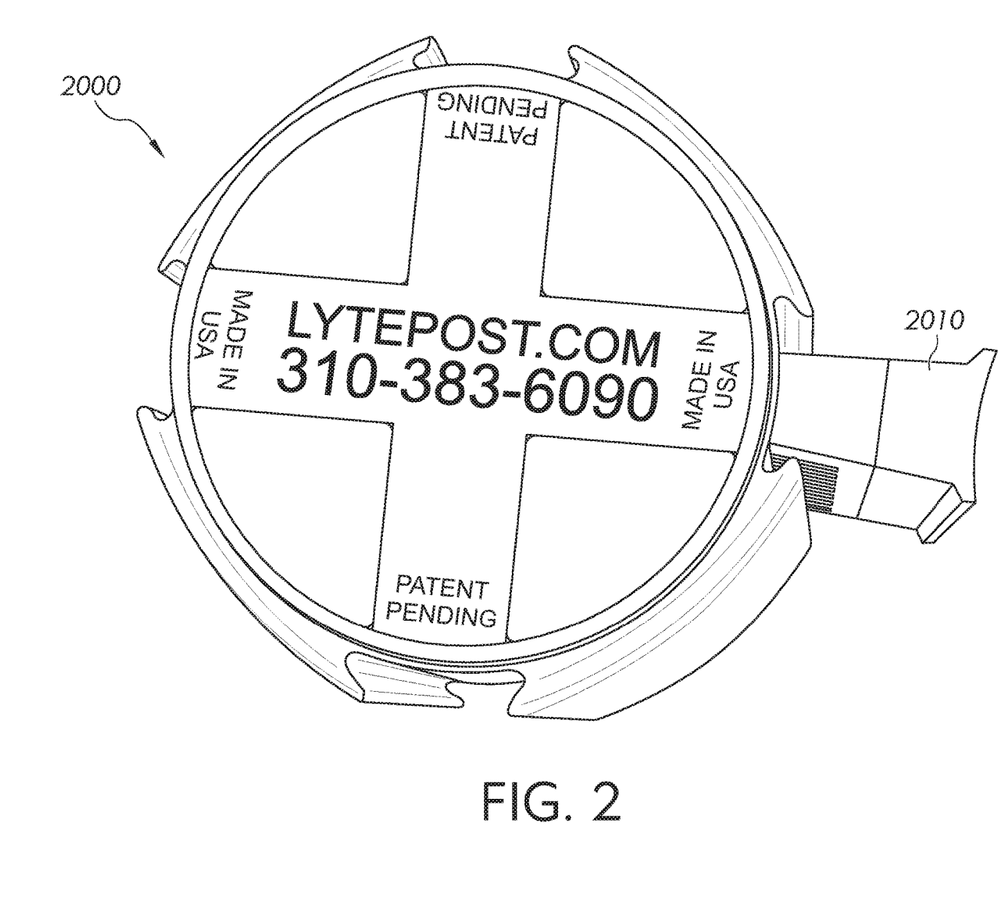
FIG. 2 illustrates a top view of cover of a visible stanchion according to an embodiment of the present invention.
Figure 3:
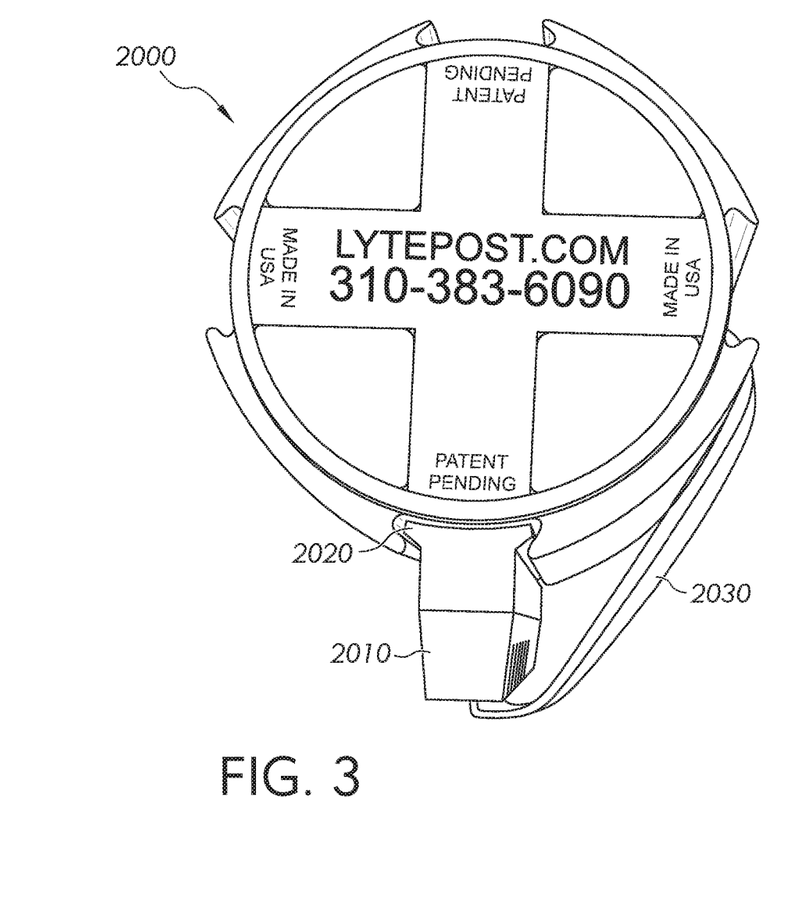
FIG. 3 illustrates another top view of a cover of a visible stanchion according to an embodiment of the present invention.

Turning to FIG. 2 and FIG. 3, example embodiments of a cover or cap for the visible stanchion 1000 are shown. FIG. 2 shows a top view of a cover 2000. In the example embodiment, the cover 2000 may include a retractable belt 2010. The end of the retractable belt 2010 may fit into a receptacle 2020. For example, FIG. 3 shows the cover 2000 having the end of the retractable belt 2010 fitly received by the receptacle 2020. The attachment of the retractable belt 2010 into the receptacle 2020 of the same visible stanchion is shown for illustration purpose only. In actual usage, a retractable belt of one visible stanchion may be attached to a receptacle in the cover of another visible stanchion, for example, to form a barrier.

In some embodiments, the cover 2000 may be removed with ease from the tube 1020 for insertion and changing of cover or cap signage, allowing for easy branding changes. For example, the cover 2000 may be attached to the tube 1020 using two screws. Other methods to attach the cover 2000 to the tube 1020 may also be used, for example, snap on or fastening with grooves on both the cover and the tube.

Figure 4:
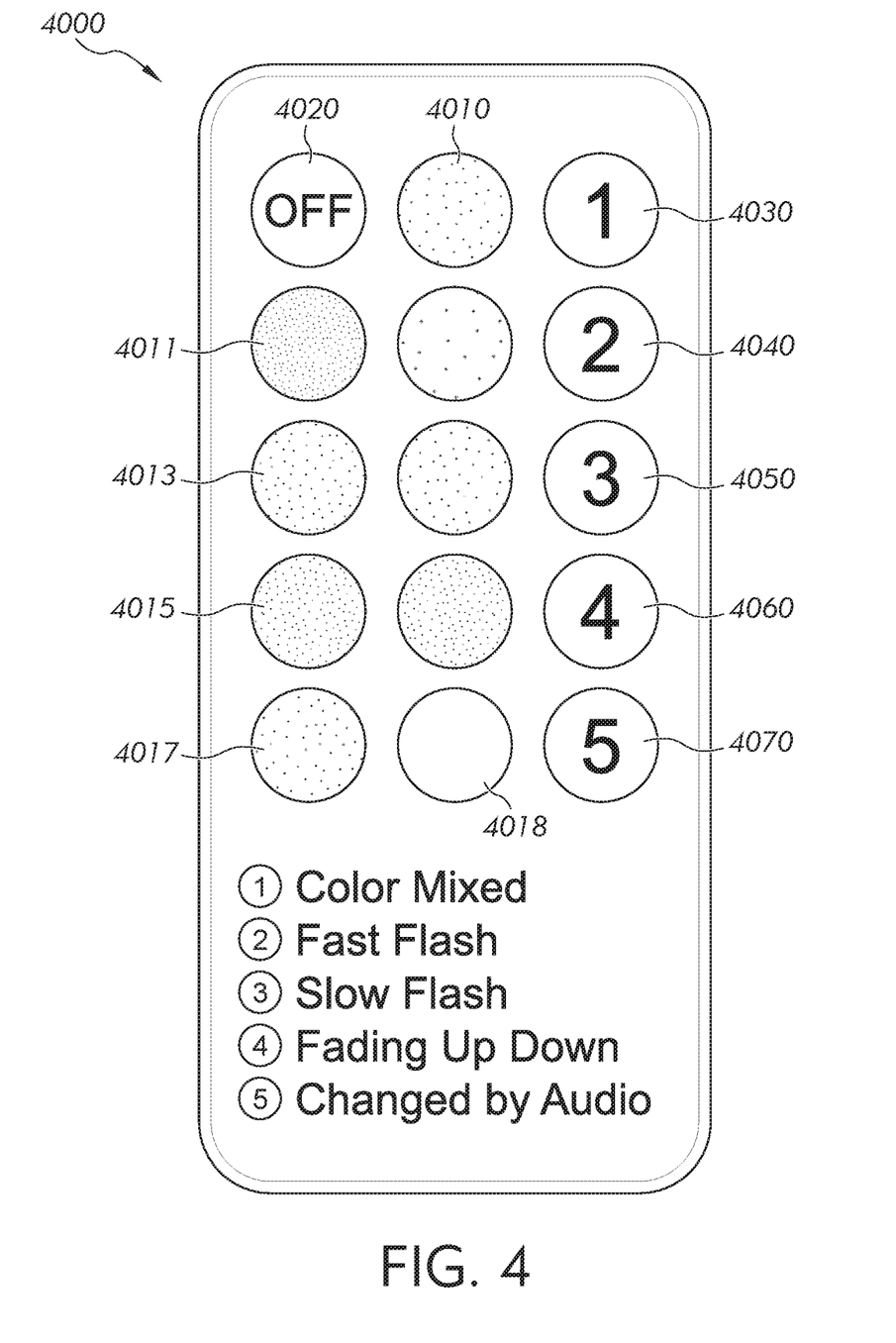
FIG. 4 illustrates a top view of a remote control of a visible stanchion according to an embodiment of the present invention.

Turning to FIG. 4, an example embodiment of a remote control 4000 is shown. In the example embodiment, the remote control 4000 may operate using infrared (IR) signal. Using the remote control 4000, a user may select to turn on different color settings for the LEDs by selecting the color of choice, for example, by selecting a color button 4010 to 4018. The colors may include, for example, yellow, red, orange, green, pink (light purple), purple, blue, light blue, and white. The user may also operate the remote control 4000 to mix the colors of the LEDs, for example, by selecting the button 4030 ("1—Color Mixed"). In this mode, the LEDs may change color at a predetermined period of time. In some embodiments, the LEDs may cycle through all available colors. In some embodiments, the LEDs may cycle through a set of predetermined colors.

The LEDs may also be selected to flash at various speeds. In this selected mode, the user may select, for example, fast flashing speed by selecting button 4040 ("2—Fast Flash"), or slow flashing speed by selecting button 4050 ("3—Slow Flash"). Other speeds may also be implemented, for example, intermittently, by a predetermined time, by a selected time, and so on.

A fading mode may also be provided, for example, by selecting button 4060 ("4—Fading Up Down"). In the fading mode, the LEDs fade before changing color, for example, at a predetermined period of time. Additional varying fading speeds may also be provided.

An OFF button 4020 may be provided to turn the LEDs off.

As mentioned herein, the LEDs may be controlled acoustically. In these embodiments, the user may activate the acoustic, or audio, mode via the remote control 4000 by selecting button 4070 ("5—Changed by Audio"). In this mode, a microphone positioned, for example, on the base circuit board 1052 may receive audio, for example, tapping sound on the visible stanchion 1000. In some embodiments, each successive sound received may cause the LEDs to cycle through the available colors. In some embodiments, all functions, for example, color mix, flashing and fading, may be controlled acoustically. In these embodiments, the functions may be cycled through each successive sound received. The acoustic control may be adjustable via, for example, a built-in variable resistor.

In some embodiments, the LEDs may pulsate to sound, for example, to music from an external source, such as a smart phone, a wearable device, a speaker, and the like.

In some embodiments, the stanchion 1000 may include Digital Multiplex (DMX) controls to allow users, including professional lighting technicians, to operate the unit from a light board. Suitable electronics and connectors known in the art may be included to support DMX.

In some embodiments, the visible stanchion 1000 may include wireless communications known in the art, for example, WiFi, Bluetooth, and so on. A user may control the visible stanchion 1000 using an application from a wireless device, for example, a smart phone, a wearable device, a tablet, and so on.

In some embodiments, the remote control 4000 may be capable of controlling multiple visible stanchions 1000, located within proximity of one another, at the same time.

Figure 5:
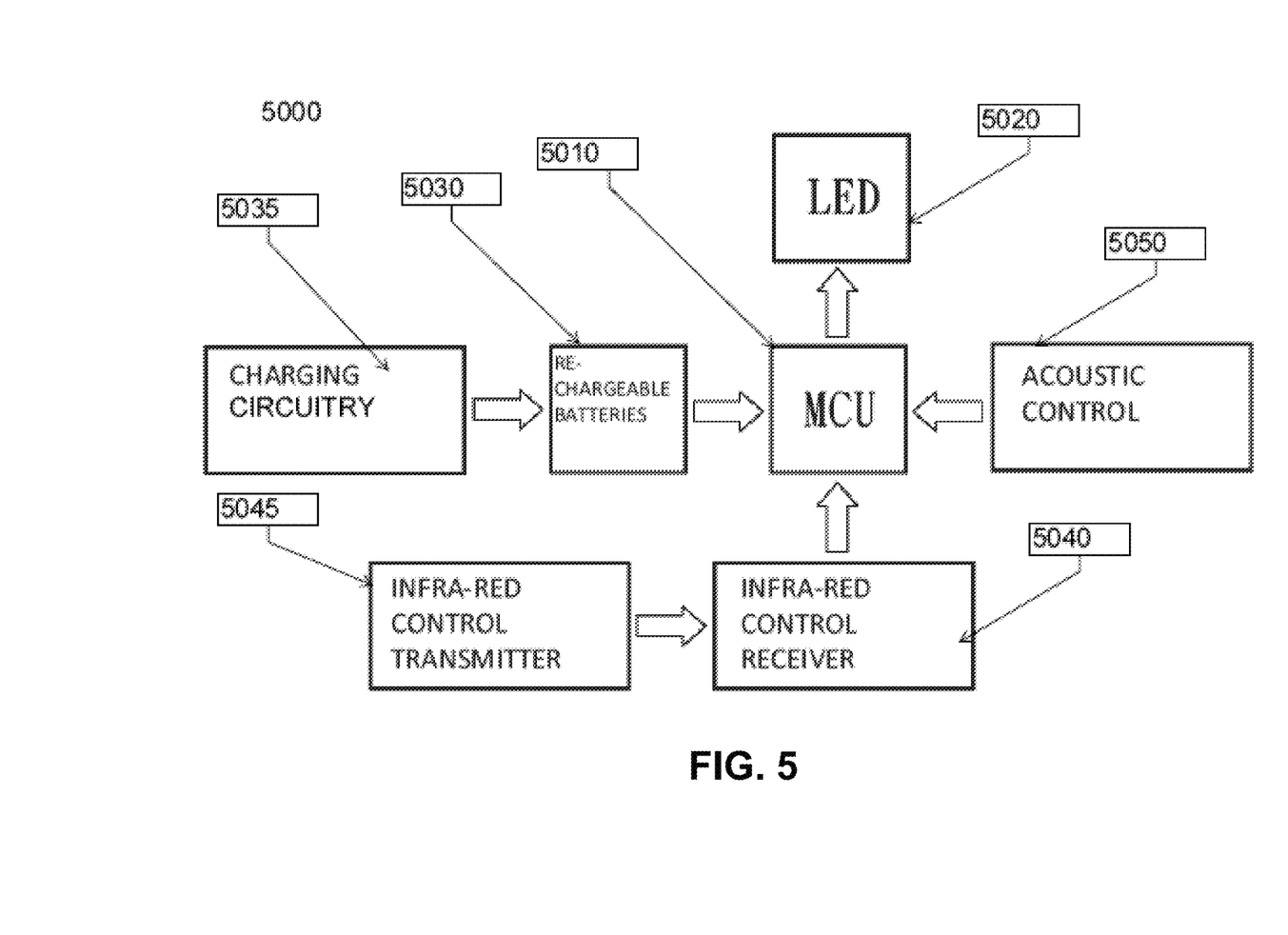
FIG. 5 illustrates a bock diagram of some electronics of a visible stanchion according to an embodiment of the present invention.

Turning to FIG. 5, an example embodiment of a block diagram 5000 of some electronic components of the visible stanchion 1000 is shown. In some embodiments, the electronic components may be positioned on the base circuit board 1052. Block 5010 is the Master Control Unit (MCU) of the visible stanchion 1000. The MCU 5010 may control all functions of the visible stanchion 1000. In some embodiments, more than one MCU may be implemented. The one or more re-chargeable battery 5030 may be charged via the charging circuitry 5035. The charging circuitry 5035 may be controlled by the MCU 5010. The infrared control receiver 5040 may receive signal from an IR remote controller, for example, remote control 4000 as described in FIG. 4, and transmit signal to the MCU 5010 for processing. The acoustic control 5020 may receive acoustic signal from a microphone (not shown), and transmits signal to the MCU 5010 for processing.

As described herein, in some embodiments, alternative or in addition to the re-chargeable battery 5030, the visible stanchion 1000 may include a USB power supply. A USB port may be included.

Figure 6:
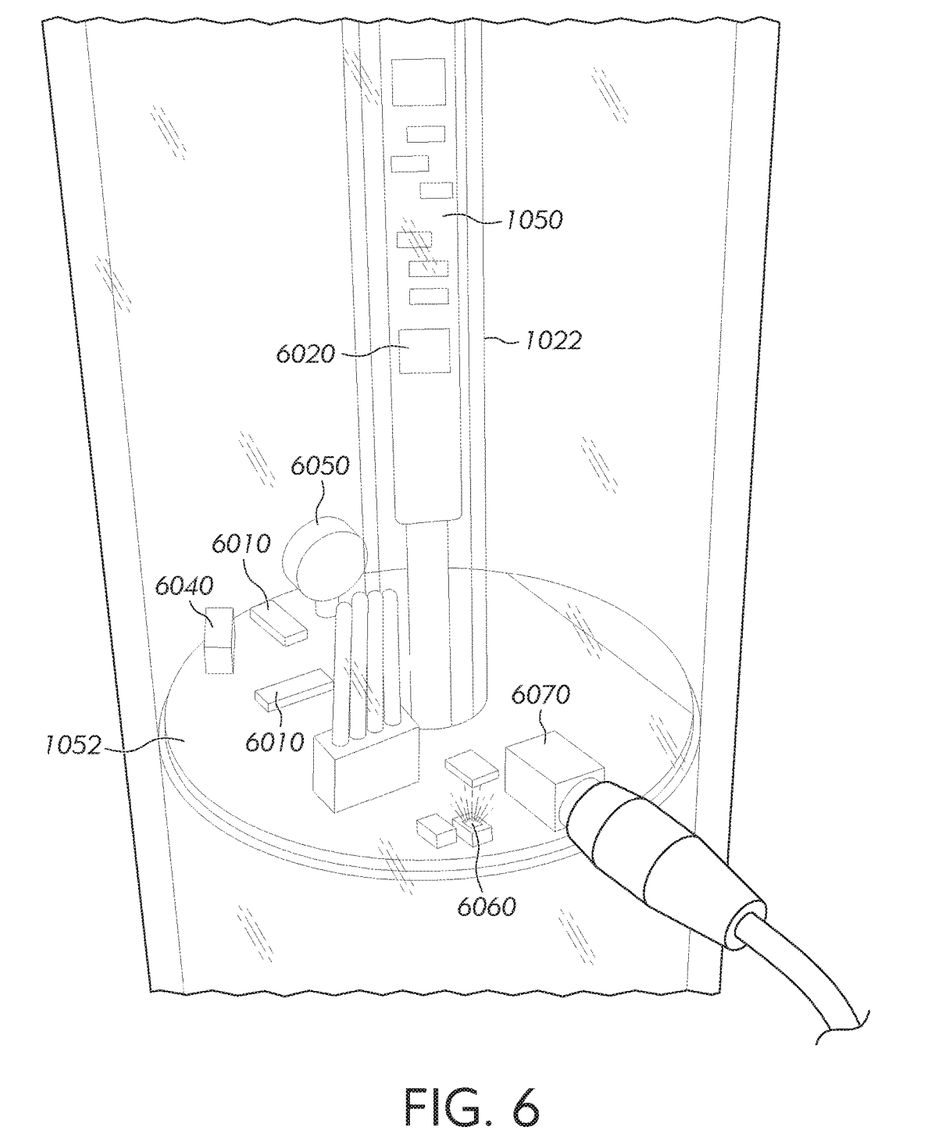
FIG. 6 illustrates a perspective view of a base circuit board of a visible stanchion according to an embodiment of the present invention.

Turning to FIG. 6, an example embodiment of a base circuit board 1052 of the visible stanchion 1000 is shown. In the example embodiment, the MCU 6010 comprises two semiconductor chips. The circuit board 1052 also includes a microphone 6050 to receive acoustic input, and an IR receiver 6040 to receive IR signal input from an IR remote control. The acoustic control may be adjustable via, for example, a built-in variable resistor (not shown). An indicator light 6060 indicates, using different colors, whether the rechargeable batteries are being recharged via the charging dock 6070, and the charging status.

As described herein, the upright board 1050 may include one or more LED 6020. In the example embodiment, the upright board 1060 is positioned inside the inner tube 1022.

Figure 7:
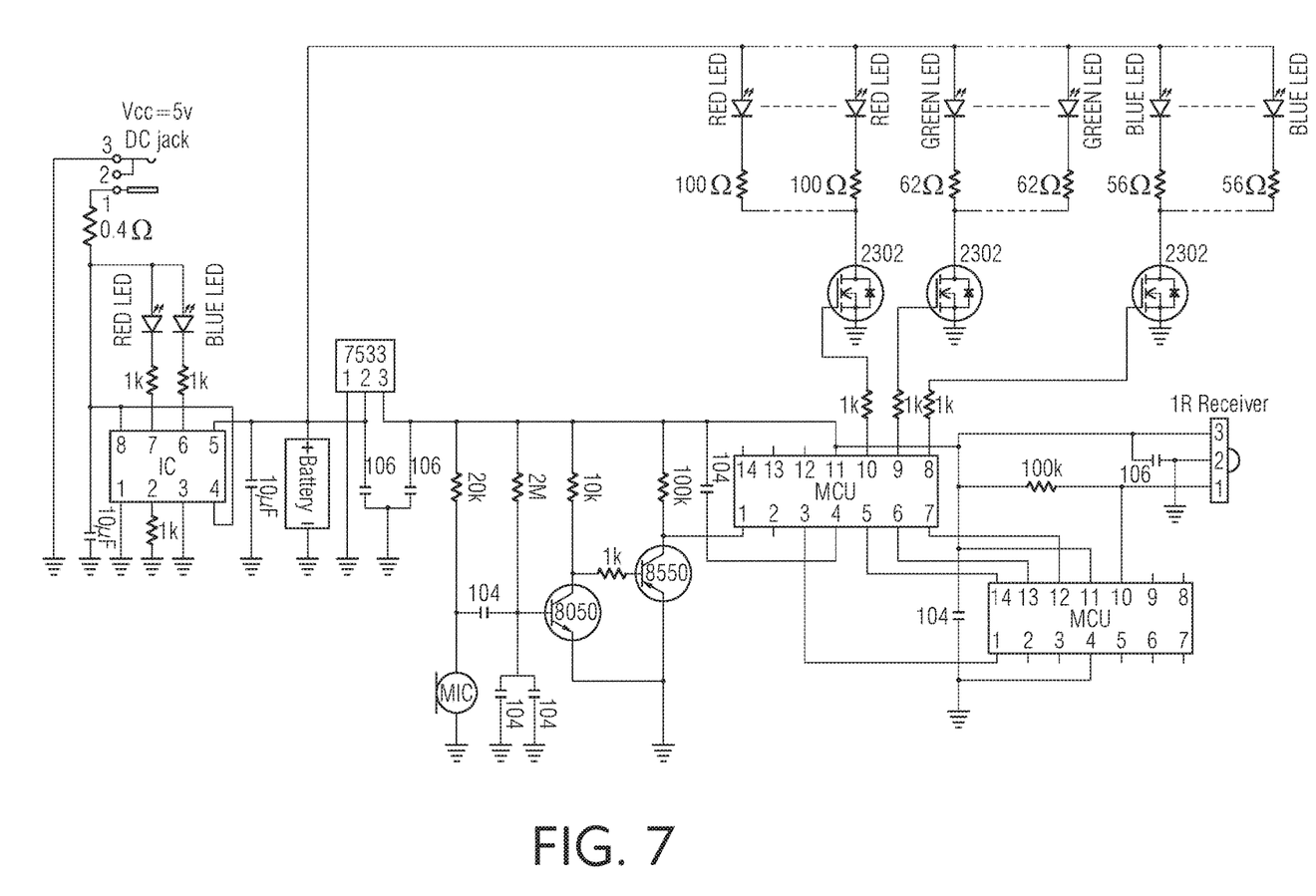
FIG. 7 illustrates a schematic of a visible stanchion according to an embodiment of the present invention.
Figure 8:
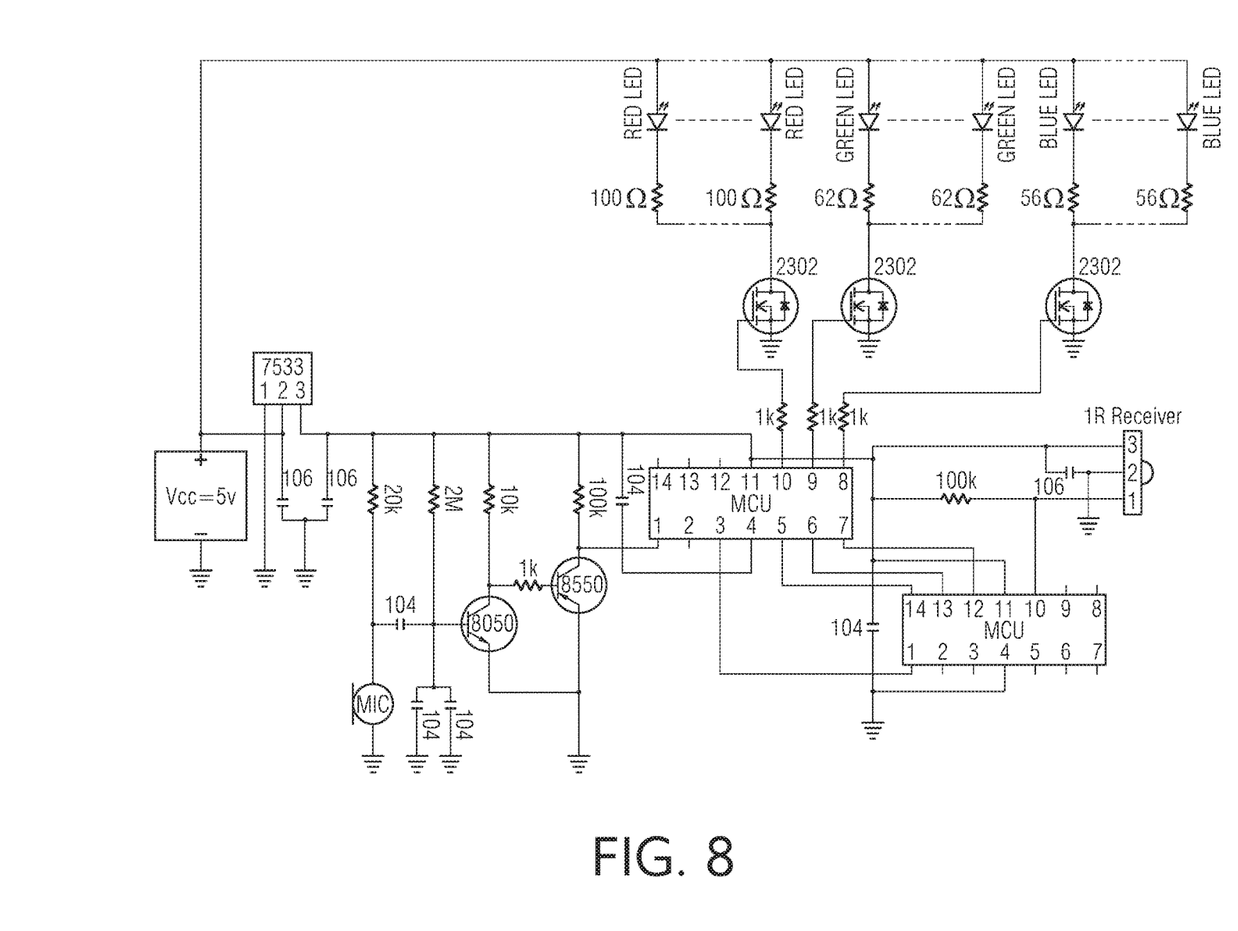
FIG. 8 illustrates another schematic of a visible stanchion according to an embodiment of the present invention.

Turning to FIG. 7, an example embodiment of a schematic of the visible stanchion 1000 is shown. The schematic includes a rechargeable battery. FIG. 8 shows an example embodiment of a schematic of the visible stanchion 1000 not including a rechargeable battery.

The enablements described above are considered novel over the prior art and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

What is claimed is:

1. A portable visible stanchion comprising:
   a circular base including a circular weight, a ring coupled to the outside wall of the circular weight, and a circular, hollow cone shape base cover coupled to the ring;
   a transparent tube coupled to the circular base;
   an inner tube positioned inside of and along the axis of the transparent tube;
   a cap removably attached to the transparent tube, the cap including signage with branding;
   a sleeve with branding removably positioned inside the transparent tube;
   a base circuit board positioned at the base of the inner tube;
   a Universal Serial Bus (USB) power supply positioned inside the circular base; and
   an inner circuit board, positioned inside the inner tube, including a plurality of light emitting diodes (LEDs), wherein the light emitting diodes provide a plurality of colors.

2. The portable visible stanchion of claim 1, wherein the light emitting diodes are controlled acoustically.

3. The portable visible stanchion of claim 1, wherein the light emitting diodes change color at a predetermined period of time.

4. The portable visible stanchion of claim 3, wherein the light emitting diodes fade before changing color.

5. The portable visible stanchion of claim 1, wherein the light emitting diodes cycle through a set of colors.

6. The portable visible stanchion of claim 1, wherein the light emitting diodes flash.

7. The portable visible stanchion of claim 6, wherein the light emitting diodes flash at various speeds.

8. The portable visible stanchion of claim 1, wherein the light emitting diodes pulsate to sound.

9. The portable visible stanchion of claim 1, wherein the ring is made of elastic material.

10. The portable visible stanchion of claim 1, wherein the USB power supply is removable.

* * * * *